April 1, 1941.　　　G. M. TURNER　　　2,236,809
STANDARDIZED SHOP EQUIPMENT
Original Filed Sept. 14, 1935　　2 Sheets-Sheet 1

INVENTOR
GILES M. TURNER
BY
Wheeler, Wheeler & Wheeler
ATTORNEYS

April 1, 1941. G. M. TURNER 2,236,809
STANDARDIZED SHOP EQUIPMENT
Original Filed Sept. 14, 1935  2 Sheets-Sheet 2
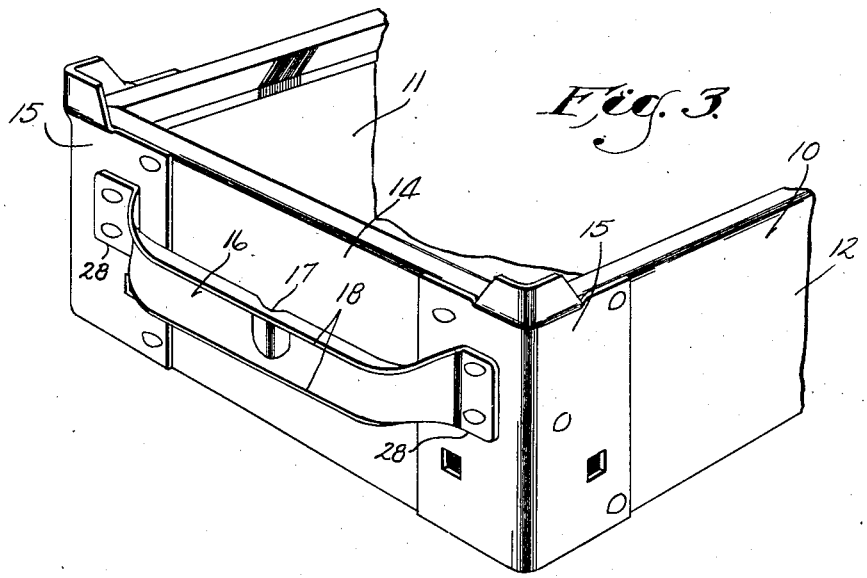
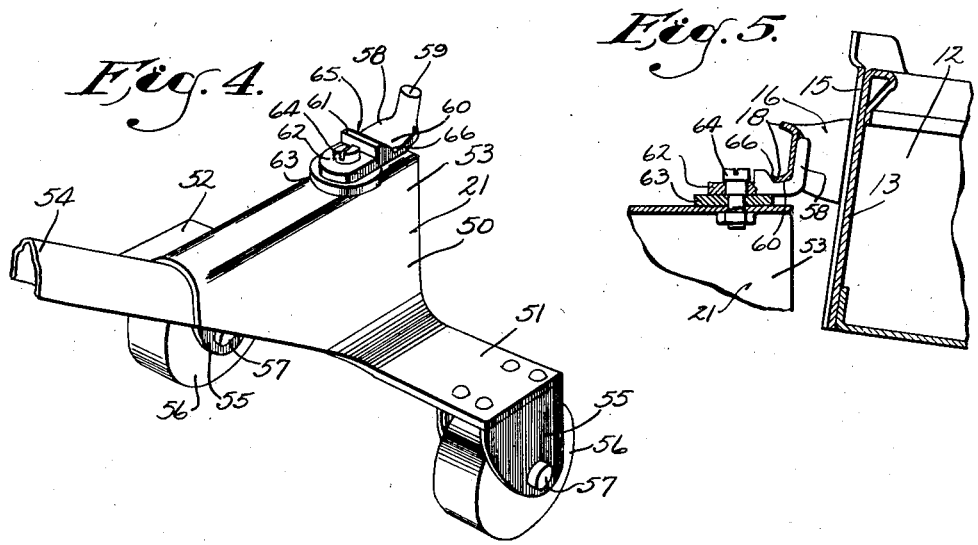
INVENTOR
GILES M. TURNER
BY
Wheeler, Wheeler & Wheeler
ATTORNEYS Patented Apr. 1, 1941

2,236,809

UNITED STATES PATENT OFFICE 2,236,809

STANDARDIZED SHOP EQUIPMENT

Giles M. Turner, Milwaukee, Wis.

Original application September 14, 1935, Serial No. 40,599, now Patent No. 2,148,090, dated February 21, 1939. Divided and this application February 17, 1939, Serial No. 256,887

3 Claims. (Cl. 280—46)

My invention relates to improvements in standardized shop equipment.

It is the object of my invention to provide a lifting dolly for one end of a tray, drawer or box whereby to convert such a member into a transport unit.

More particularly stated, it is the object of my invention to provide a lifting dolly which is not only more easily engageable and operable with a tray or other transport unit in shop practice, but also to dispose the lifting dolly wheels in such relation to the portion of the dolly which directly engages the tray that the tray may be no hindrance to the steering motion of the dolly.

Another object of my invention is to so construct the hook of a lifting dolly for the purpose described as to make its interaction with the dolly somewhat pendular and thus facilitate the engagement of the hook with a transport tray.

In the drawings:

Fig. 3 is a perspective of one end of my standardized tray to receive and be engaged by my new lifting dolly.

Fig. 4 is a perspective of my lifting dolly.

Fig. 5 is a detail of a pivot bolster for my lifting dolly in engagement with a handle of a tray.

Like parts are identified by the same reference characters throughout the several views.

Figure 1:
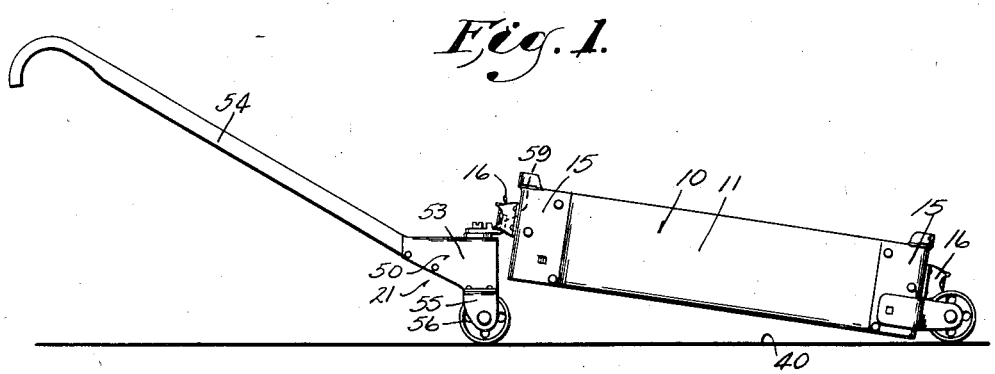
Fig. 1 is a side elevation of my tray with a creeper dolly and my new lifting dolly engaged therewith.
Figure 2:
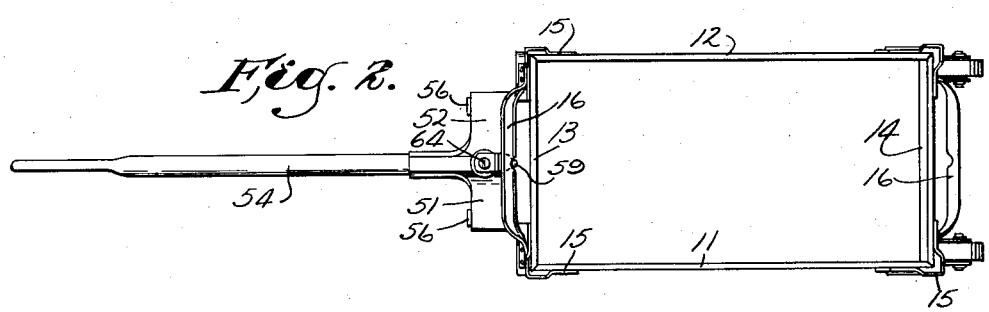
Fig. 2 is a plan view of the structure shown in Fig. 1.

This is a division of my Patent No. 2,148,090 dated Feb. 21, 1939.

As stated above, one of my standard units for factory equipment is a tray, drawer, or box 10, which I shall hereinafter refer to as a tray, it being understood that my invention relates to attachments for any similar form of storing, carrying, or transporting element wherein the element must be kept substantially horizontal and may not be tilted to an angle such that articles on the tray will be dislodged over shallow walled margins.

My standardized unit is provided with side walls 11 and 12 and end walls 13 and 14, with a corner brace 15 at each corner, whereby to reenforce the tray. A handle 16 secured to the corner braces 15 is provided centrally with a depression 17 and outwardly extended margins 18, since the handle is formed of metal with a channel shape, as shown clearly in the drawings.

Such a tray as above described may be filled with exceedingly heavy material which would tax the strength of any workman were he to attempt to lift it by the handles 16, and I therefore provide my new creeper dolly 20 and my lifting and steering dolly 21 for ready attachment to the tray 10, as will now be described.

I provide for connection with either end of the box 10 a dolly which I have termed a "creeper dolly," since it is constructed for use closely adjacent the floor or other supporting surface for the box 10, and this dolly is intended to provide for merely a slight elevation of the end 14 of the box, to which, for example, I have shown it attached.

With the creeper dolly in place upon the end 14 of the tray 10, it is desirable not only to place a wheeled element under the end 13, but it is also desirable to elevate that end of the tray sufficiently to cause the end 14 to clear the supporting surface 40. I therefore provide a two-wheeled drawing, guiding, and lifting dolly 21, shown most clearly in Figs. 1 and 4. I prefer to form the frame 50 of this dolly out of pressed metal to provide lateral extensions 51 and 52 extending from a central raised portion 53 which is substantially U-shaped in cross section. Forwardly and upwardly from this portion 53 of the frame 50 I extend a handle 54 of suitable length and configuration for easy handling by a workman.

The dolly 21 is provided with brackets 55 in which wheels 56 are mounted upon pins 57.

Upon the central raised portion 53 of the frame 50 I provide a hook 58, which includes a forwardly and upwardly extending spud 59, a weight-supporting table 60, a cam-shaped handle abutment 61, and a platform 62. This platform has a plane under surface to bear upon the plane upper surface of a turntable 63 secured to the top of the raised central portion 53 of the dolly. A king-pin 64 provides a pivot mounting for the entire hook 58, which may swing freely about pivot pin 64, special not being made, however, of the fact that the greater portion of the weight of the material in the hook 58 is eccentrically mounted, whereby to tend to center the entire hook 58 by gravity when the dolly is in inclined position.

The cam face 65, inclined downwardly toward the weight-supporting table, is very slightly shouldered at 66, and it is against this shoulder that the edge 18 of handle 16 of the tray bears when the spud 59 of hook 58 is in the depression 17 of the handle. This is shown clearly in Fig. 5. To thus engage the spud 59 with the handle the workman may tilt the dolly 21 by raising the handle 54, and because of the pendular motion of the hook 58 the spud 59 is naturally disposed in proper position to hook under handle 16 of the tray. A downward thrust on the handle 54 will then elevate the handle 16 and at the same time cause the outer margin 18 of handle 16 to abut the shoulder 65 and "cramp" the spud 59 into position in the depression 17. With the creeper dolly erect under the handle 16 the hook 58 cannot be displaced laterally on the handle 16.

The elevating motion incident to the lowering of the handle 54 when the hook 58 is engaged centrally with the handle 16 brings the axes of wheels 56 directly under the weight supporting table 60 or slightly rearwardly thereof toward the tray so that if a workman should accidentally release his hold upon the handle 54 the central raised portion 53 of the elevating dolly will contact the lower margin of the end 14 of the tray.

When the elevating dolly 21 is in engagement with the handle 16 the end 13 of the tray is elevated sufficiently to "clear" the lateral extensions 51 of the elevating dolly. Steering action therefore is easy and directional control in the hands of the workman is complete.

From the above description it will be apparent that a tray 10 may be converted into a transport unit with ease and facility, since with the creeping dolly in the position shown in Fig. 3, a workman may take the lifting and steering dolly, and by inclining the handle 54, may dispose the spud 59 in position under handle 16 with the spud opposite depression 17. By pulling the handle 54 downwardly into operating position, a lifting or elevating action is accomplished upon the hook 58, whereby to positively engage the central portion of the handle 16 upon the hook and at the same time raise the end 14 of the tray sufficiently to place the end 13 of the tray in load bearing relation to the wheels 31 of the creeper dolly.

The entire assembly is then a complete transport unit which may be moved and stored readily to a new location, where, if necessary, the workman may restore the tray to a position upon the floor or other supporting surface by tilting the handle 54 upwardly and thus lowering the end 13 of the box to the floor and disengaging the spud 59 from the depressed portion 17 of the handle. Simultaneously with such an operation the weight is removed from the wheels 31. The lifting and steering dolly is then released for use with other trays or other standard units.

I claim:

1. The combination with a tray having a projecting member, of a wheeled lifting dolly provided with a hook to engage the projecting member, said hook being in turntable relation to the dolly upon a substantially vertical axis when the dolly is in working position in engagement with the tray, the hook being provided with eccentric weight whereby, when the dolly is tilted, to present the hook for engagement with the projecting member.

2. A tray having a handle with a margin outwardly extended from the tray and a depressed portion opposite said margin, a dolly attachable to the tray and provided with a hook including a stud for reception in the depression, and a shoulder for abutment by said margin to lock the hook to said handle.

3. In a wheeled dolly having a handle and an upward extension adapted to rockably engage and lift a load bearing unit, means for accomplishing the engagement comprising a hook mounted on a normally vertical axis on the upward extension, the hook comprising a weight eccentric to its axis, whereby to move pendularly to facilitate the engaging operation.

GILES M. TURNER.